(12) United States Patent
von Wendorff et al.

(10) Patent No.: US 8,375,256 B2
(45) Date of Patent: Feb. 12, 2013

(54) SYSTEM WITH CONFIGURABLE FUNCTIONAL UNITS AND METHOD

(75) Inventors: Wilhard von Wendorff, Munich (DE); Detlev Leisengang, Gilching (DE)

(73) Assignee: Infineon Technologies AG, Neubiberg (DE)

( * ) Notice: Subject to any disclaimer, the term of this patent is extended or adjusted under 35 U.S.C. 154(b) by 326 days.

(21) Appl. No.: 12/467,733

(22) Filed: May 18, 2009

(65) Prior Publication Data
US 2010/0042871 A1 Feb. 18, 2010

(30) Foreign Application Priority Data
May 19, 2008 (DE) .......................... 10 2008 024 193

(51) Int. Cl.
*G06F 11/00* (2006.01)
(52) U.S. Cl. ........................................................ 714/49
(58) Field of Classification Search .................. 714/11, 714/13, 49; 712/15
See application file for complete search history.

(56) References Cited

U.S. PATENT DOCUMENTS

| | | | |
|---|---|---|---|
| 4,823,256 A | 4/1989 | Bishop et al. | |
| 6,035,416 A * | 3/2000 | Abdelnour et al. | 714/11 |
| 6,408,402 B1 * | 6/2002 | Norman | 714/10 |
| 6,502,019 B1 | 12/2002 | Zydek et al. | |
| 6,772,368 B2 | 8/2004 | Dhong et al. | |
| 6,973,608 B1 | 12/2005 | Abramovici et al. | |
| 2002/0157071 A1 | 10/2002 | Schiefele et al. | |
| 2008/0134108 A1 * | 6/2008 | Master | 716/2 |

FOREIGN PATENT DOCUMENTS

| | | |
|---|---|---|
| DE | 198 00 311 A1 | 7/1999 |
| EP | 0 185 704 B1 | 7/1986 |
| KR | 2002-0033254 | 5/2002 |

OTHER PUBLICATIONS

Strunk, J.,"Entwicklung eines Software-Frameworks zur Unterstutzung dynamisch rekonfigurierbarer Hardware auf Basis von Virtex-II Pro FPGAs," thesis, Technische Universitat Chemnitz, Aug. 31, 2005, 91 pages.

* cited by examiner

*Primary Examiner* — Scott Baderman
*Assistant Examiner* — Yair Leibovich
(74) *Attorney, Agent, or Firm* — Slater & Matsil, L.L.P.

(57) ABSTRACT

A method and a system is provided for the processing of data or signals with a number of functional units which are each adapted to apply one or several functions to the data or signals, and which are connected with each other via a connection matrix for the exchange of data or signals between the functional units. At least one functional unit of the system is programmable and/or configurable such that it performs a particular function out of a number of different functions. The connection matrix is programmed and/or configured such that the functional units are connected with each other in a particular configuration out of a number of different configurations.

29 Claims, 3 Drawing Sheets output signal = function (input signal)
output signal = $f$ (input signal)

SYSTEM WITH CONFIGURABLE FUNCTIONAL UNITS AND METHOD

This application claims priority to German Patent Application 10 2008 024 193.8, which was filed May 19, 2008 and is incorporated herein by reference.

TECHNICAL FIELD

The instant statements relate to electronic data processing systems with configurable functional units.

BACKGROUND

Electronic data processing systems comprising a number of functional units are known. These functional units may, for instance, be implemented in semiconductor devices comprising integrated circuits that are adapted to perform the corresponding functions. Microcontroller or microprocessor systems are, for instance, known which comprise one or a plurality of (central) control or processing units (CPU). The CPU or the CPUs may, in combination with one or a plurality of memory means, e.g., a program and a data memory means, perform various objects or programs or fulfill various functions, respectively.

System integrity and the possibility of detecting a system that operates incorrectly or faultily is important in many fields of use of electronic data processing systems. A reliable operating mode is particularly important with electronic data processing systems that control or monitor, for instance, life-supporting functions or fulfill observing tasks. Such systems therefore have safety functions that are executed on occurrence of a malfunction by the system with the object of achieving or maintaining a safe system state.

The detecting of systems that operate incorrectly or faultily and the possible activating of safety functions is, as a rule, done by the implementation of redundancy, whereby it is possible to test the operability or to detect a malfunction of the system, respectively. In the instant context, redundancy means that the system performs the same function multiple times, so that a misconduct or a malfunction, respectively, of corresponding functional units of the system may be detected by a comparison of the corresponding functional products.

Three classes of redundancies may be differentiated. A first class of redundancy that is adapted to be used for testing the operability or for detecting a malfunction of the system is the temporal redundancy. When using the temporal redundancy, a function is performed at different points in time as a rule on the same implementation, and the corresponding functional behavior of the system is compared with one another. This may, for instance, be the performance of a function during the development time of a system which is compared with the performance of the function under normal operating conditions or in the field, respectively, which is also referred to as a test routine.

A second class of redundancy that is adapted to be used for testing the operability or for detecting a malfunction of the system is the local redundancy. For applying the local redundancy, a system resource is, for instance, implemented multiple times at different places and thus the performance on the same implementation. Thus, it is possible to perform the same function of the system on several resources and to compare the functional behavior of the system. This way it is, for instance, possible to test the operability of synchronized dual processor systems in vehicle dynamic control systems.

A local redundancy may, for instance, be installed wherein two or more resources or functional units of a system perform the same function and their functional products are compared with one another. In the case of concurrence of the functional products delivered by the functional units, a correct function of the system may be concluded, and in the case of a deviation of the functional products delivered by the functional units, a malfunction of the system may be concluded.

A third class of redundancy that is adapted to be used for testing the operability or for detecting a malfunction of the system is the functional redundancy. When applying the functional redundancy, a system operability is implemented multiple times in a different manner. For error detection, these functionally similar implementations are compared with one another either to show a behavior that is harmonious or concurrent with respect to each other, or to show a deviating behavior.

Each of these three redundancy classes causes an additional resource effort in the electronic system, e.g. processor performance, digital gate, additional bandwidth, or additional performances. Since the redundancies required in a system strongly depend on the application of the electronic system, application-specific developments may entail the following problems.

On the one hand, an application-specific development may, due to the reduced complexity vis-à-vis an application-comprehensive development, reduce the number of the systematic and random errors. However, in the case of an application-comprehensive development, the statistic liability vis-à-vis an application-specific development may be increased to detect systematic errors and seize adequate measures to avoid them by a plurality of different fields of use. On the other hand, many such application-specific developments may increase the development time and the costs of the development and of the operation.

Multiple available locally redundant devices usually operate pursuant to the same synchronously performed programs and algorithms, and in accordance with the same initial values. In so doing, however, they basically operate independently of each other, e.g., with MIMD ("Multiple Instruction Multiple Data"). For increasing the function, redundant systems are frequently established, wherein the system operability may be distributed or provided statically or dynamically to the redundant resources. Such redundant systems either operate independently and on an equal footing, e.g., with MIMD ("Multiple Instructions Multiple Data"), or sequentially hierarchically, e.g., in the manner of coprocessors.

A strategy for safeguarding electronic data processing systems has so far been to implement the resources redundantly and to partially also implement them multiple times. Thus, the German Patent publication DE 19800311 A1 and Korean Patent publication KR 2002033254 describe, for instance, the multiple implementation of the substantial digital control means. Here, the principles of local redundancy (dual processor core) and of functional redundancy (parity or "ECC" error correction memory redundancy) may also be applied.

Redundant systems that enable a switching of local redundant resources in two different configurations are known. U.S. Pat. No. 6,772,368, for instance, discloses a system in which two locally redundant systems operate in a completely self-sustaining manner in one configuration, and in another configuration discloses a system in a completely parallel-synchronized manner. The possibility of a mutual replacement of the resources (so-called "Hot Swap") or the mixing of different redundancy classes, especially of the functional redundancy with the local redundancy, does, however, not exist.

Further, redundant systems are known whose redundancy is capable of mutually replacing in the case of a system failure. The object in this case is to increase the availability of the system. Thus, the European Patent publication EP 0185704, for instance, describes a system in which redundant processors perform algorithms and programs independently of each other (MIMD: "Multiple Instructions Multiple Data"). If a part of the functional units or processors of the system fails, the functional units or processors that are still capable of operating, additionally assume the tasks of the failed functional units or processors. This function transfer is also referred to as configurability. However, the configurability does not permit any operation of the system in which configurable errors are detected or alternative functions are promoted.

SUMMARY

Embodiments of the present invention provide an electronic data processing system or method, in which the resources of electronic data processing systems are designed such that they are adapted to be implemented redundantly in a configurable manner. To this end, the resources or functional units of the data processing system may be configured or programmed to different functions. Furthermore, a connection matrix that connects the inputs and outputs of the resources or functional units, respectively, of the data processing system with one another may be configured or programmed in a different manner, so that different connections between the functional units result. The configuration may be of a dynamic or static nature and may take place during the development phase or during the operative phase of the system, respectively.

Embodiments of the present invention may be used with electronic data processing systems that are constructed of one or a plurality of functional units. The electronic data processing system may, for instance, be implemented in a number of semiconductor devices while the functional units may be designed in the form of integrated circuits or processors.

A functional unit means, in this context, an electronic circuit transferring one or a plurality of input signals to one or a plurality of output signals. The time between the providing of the input signals and the generated output signals is in the following referred to as performance time. The generation of the output signals as a function of the input signals is referred to as a function in the following.

Various applications of an electronic data processing system may place different demands to the redundancy and/or the performance of the system. Such electronic data processing systems may be implemented differently in a semiconductor device or a semiconductor module with a plurality of components.

In accordance with one embodiment, the present invention comprises the following components: at least one integrated circuit or device with a number of configurable functional units, and inputs and outputs of the configurable functional units which are adapted to be connected configurably with each other via a connection matrix.

This connection matrix comprises a number of electrical connections between the inputs and the outputs of the configurable functional units for the exchange of data or signals between the functional units. The connection matrix is configurable or programmable such that one and the same circuit can, due to different configurations of the connection matrix and the functional units, alternatively be operated in two or several of the following manners: two or more functional units produce the same or the identical function. In so doing, the connection matrix is configured such that the multiple generated function results are switched to a further functional unit that compares them with each other, and that a misconduct of one or several functional units or connections can be detected, so that a redundancy for the corresponding system function is established. The redundancy may, for instance, be of local, temporal, and/or functional manner.

These two or more functional units and the connection matrix between the functional units may be configured such that the system function is distributed to the two or more functional units such that a reduction of the performance time is achieved or a qualitative and/or quantitative extension of the function or the functions is performed, so that a function extension may be achieved.

These two or more functional units may further replace one or several other functional units. They may, for instance, have a similar or equal function as the replaced functional unit(s), they may, however, also show or have a completely different function so as to, for instance, monitor the error tolerance or establish a failure safety.

In accordance with one aspect of the present invention it is consequently possible to configure or program comparative functions of synchronous redundant systems such that they can alternatively be used to extend the functions. In accordance with a further aspect of the present invention, the electronic resources of the system may be implemented redundantly in a configurable manner for the functional safeguarding of electronic data processing systems, i.e., for the increasing of a reliable operability of the system.

In accordance with an embodiment of the present invention, it is also possible to implement, for safeguarding an electronic data processing system, the electronic resources thereof redundantly in a multiple configurable manner. According to yet another embodiment of the present invention, it is possible, for the functional safeguarding of an electronic data processing system, to implement the electronic resources thereof redundantly in an alternatively configurable manner.

In the case of an alternative configurability of the redundancies, a first part of the configurations may, for instance, be directed to the increasing of the operability of the system so as to increase, for instance, the performance of the system, and a second part of the configurations may be directed to the increasing of the redundancy so as to detect incorrect or faulty system behavior. To this end, the above-described functional or local redundancy may, for instance, be used.

The configuration of the system may, for instance, take place during the development or designing of the system. Alternatively, the configuration of the system may also be performed during the operation or in the field, respectively, by the end user. To this end, it may be indicated in the documentation of a system how its configuration can be performed. Different redundancies of the system may result in a deviating operating mode or a deviating behavior of the system before and after a configuration.

BRIEF DESCRIPTION OF THE DRAWINGS

In the following, the invention will be explained in more detail by means of preferred embodiments and the enclosed drawings.

DETAILED DESCRIPTION OF ILLUSTRATIVE EMBODIMENTS

Figure 1:
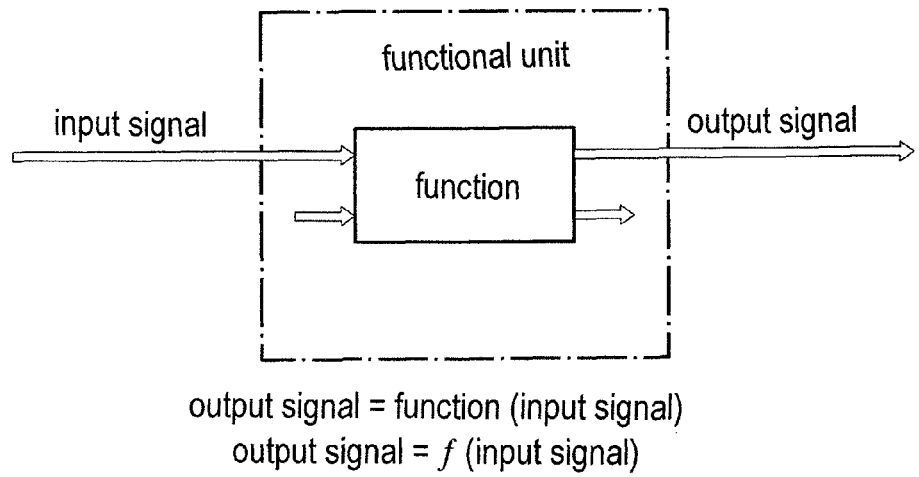
FIG. 1 shows a schematic representation of the configuration of a functional unit for increasing the functional scope of a system in accordance with an embodiment of the present invention.

FIG. 1 shows an example for the configuration of a functional unit for increasing the functional scope of a system according to an embodiment of the present invention. The functional unit is illustrated as a dashed rectangle in FIG. 1 and may, for instance, be a processor or an integrated circuit designed for performing electronic data or signal processing. The functional unit may, for instance, be a system component of the following type:

1. processors
2. input units
3. output units
4. memory units
5. logic units

In a first configuration, the functional units may serve to increase the functional scope. This may, for instance, be achieved by an independent operation of the functional units.

The functions performed by the functional unit of the system may, for instance, comprise one or several of the following actions:

state generation or state detection of a state or a combination of states;

event generation or event detection of an event or a combination of events;

detection of an error or a malfunction of the system;

storing of a state or of an event; or other functions.

In the example illustrated in FIG. 1, the functional unit is configured such that an input signal is supplied to the functional unit in response to which the functional unit applies a particular function and outputs the function product as an output signal. The output signal accordingly corresponds to the function of the input signal, i.e., output signal=function (input signal) or output signal=f (input signal)

The input signal or the output signal need not be supplied explicitly, i.e., from outside of the functional unit, nor leave the functional unit explicitly, i.e., to the outside. Alternatively, the functional unit may also be configured such that the input signal is supplied again implicitly, i.e., within the functional unit, or the output signal may also be transferred implicitly, i.e., within the functional unit, as is shown by the lower arrows in FIG. 1. Thus, for instance, the time may be supplied implicitly to a functional unit by a supplied clock signal or the like, or may leave the functional unit explicitly. It is to be understood that the function may also have a non-linear character or may, for instance, involve state data.

It is also possible that two or several functional units perform or provide the same function if they generate identical output signals for all input signals occurring. Moreover, two or more functional units may perform or provide the same function if similar output signals are generated for all occurring input signals. The output signals of a functional unit may comprise data or configurations for other functional units. These data or configurations for other functional units may be the product of the function used by the functional unit.

In accordance with an embodiment of the invention, one or several of these functional units may be configured or programmed such that they may, for instance, be operated in one or several of the following ways.

The functional units generate the same or the identical function as one or several other functional units. Thus, it is possible to detect, by comparing these two or more functional products, a misconduct of these or of one of the other functional units, so that a redundancy is generated. This redundancy may, for instance, be of local, temporal, and/or functional kind.

The functional units examine whether two or more functional units show or have the same function (error detection). This error detection may, for instance, be based on local, temporal, and/or functional redundancy.

The functional units extend the performance of the system. An extension of the performance here means either a reduction of the performance time of a function, or a qualitative and/or quantitative extension of the functions of the system (function extension).

The functional units replace one or several other functional units. The functional units, for instance, show a similar or equal function as the replaced functional unit or the replaced functional units. The functional units may also show or perform another function (error tolerance, failure safety) than the replaced functional unit or the replaced functional units.

In accordance with a further aspect of the present invention, the configurability and/or programmability of a functional unit may, for instance, be provided at one of the following points of time.

During the development phase of the system, for instance, by the physically configured implementation of a corresponding circuit in one of the semiconductor devices during the manufacturing, and/or during the operation of the system in use or in the field, respectively, for instance by a corresponding application-controlled configuration of the corresponding circuit, and/or if an incorrect or faulty function of one or several functional units of the system exists.

In the instant context, the configuration or programming of a functional unit means that the functional unit obtains a configuration or programming that changes the functional unit such that it is caused or enabled to perform a particular function, i.e., to apply a particular function on incoming signals or data and to output the corresponding function product as outgoing signals or data.

The configuration or programming of the functional units may, for instance, be performed: statically, i.e., it may be determined once, e.g., after each system start, and then remains invariable, or dynamically, i.e., it may be variable as a function of an event or state in the course of the system operation.

Pursuant to an embodiment of the present invention, in the case of a static configuration, a functional unit implemented redundantly in a configurable manner may once and invariably be configured by another functional unit. In the case of a dynamic configuration, a functional unit implemented redundantly in a configurable manner may time and again be newly configured by another functional unit and may, for instance, be adapted to modified requirements or marginal conditions of the system.

Embodiments of the present invention may be used in a plurality of applications which are intended to fulfill two or more different scopes or requirements of performance, error detection and redundancy properties. Due to the inventive configurability of redundant functional units with similar functions which may, however, have a different functional scope, one and the same system may be configured differently.

An inventive circuit with a number of functional units may, by a modified configuration of the connection matrix between the functional units and optionally by a modified configuration of the functional units, be used in a plurality of applications which require two or more different scopes of performance, error detection, and redundancy properties.

Figure 2:
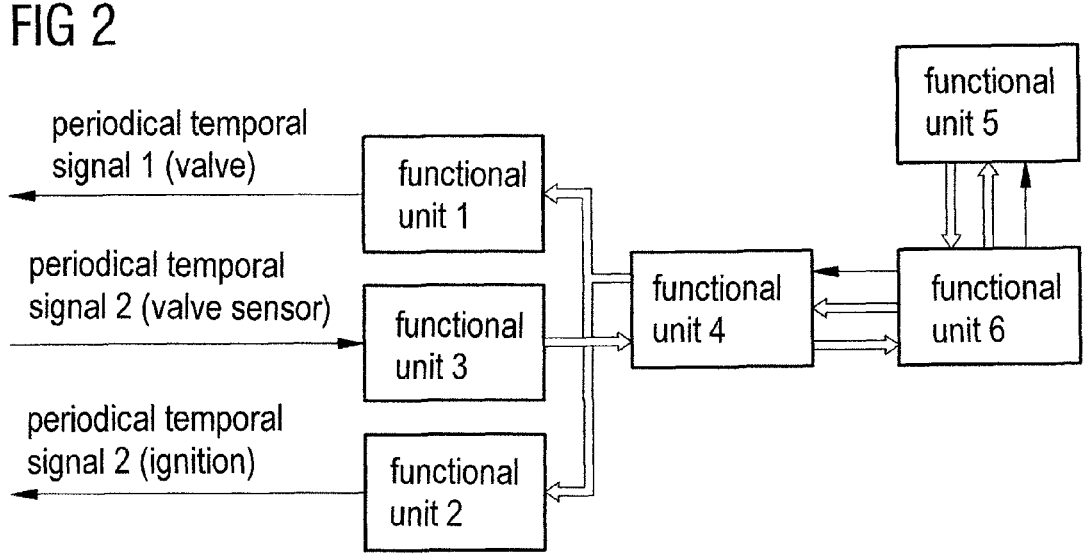
FIG. 2 shows a schematic representation of the configuration of functional units for the functional extension of a system according to a further embodiment of the present invention.

FIG. 2 shows an example of the configuration of functional units for increasing the functional extension of a system according to a further embodiment of the present invention. In a first configuration, the functional units 1, 2, and 3 serve the increasing of the functional scope of the system, i.e., the increasing of the number of functions performed by the system, e.g., per time unit. This may, for instance, be performed by an independent operation of the functional units 1, 2, 3.

By means of the embodiment of the present invention illustrated in FIG. 2, a circuit having the following 6 functional units is to be described.

Functional unit 1 and functional unit 2 are timer units which are each adapted to generate a pulse width modulated signal.

Functional unit 3, for instance, performs a function that is adapted to count pulses and to compare pulse width signals.

Functional unit 4 and functional unit 5 are each microcontrollers that are, for instance, adapted to execute a program in an instruction memory.

Functional unit 6, for instance, performs a function that is adapted to check data for plausibility and to move data (intelligent DMA).

In the embodiment illustrated in FIG. 2, a plurality of functional units 1, 2, 3, 4, 5, 6 are thus provided which are connected with each other via signal lines that are illustrated schematically by arrows. The signal lines constitute a connection matrix via which the inputs and outputs of the functional units are connected with each other. In accordance with an embodiment of the invention, this connection matrix may be configured or programmed differently with a number of signal lines, so that different connections between the functional units result. The connection matrix may, for instance, be configured or programmed as a function of the application case of the system or circuit, or as a function of an event or state.

The fourth functional unit 4 may, for instance, read the performance data of the third functional unit 3, filter these performance data, merge them, convert them, and transfer these performance data to a sixth functional unit 6. Furthermore, the fourth functional unit 4 may read data from the sixth functional unit 6, process and convert these read data, and, on their basis, configure or program the first and second functional units 1, 2 such that the first and/or the second functional unit(s) 1, 2 generate(s) accordingly modified time signals.

A fifth functional unit 5 may, for instance, read data from the sixth functional unit 6 and generate data that are modified by corresponding control algorithms and models, which may in turn be transmitted to the sixth functional unit 6 and be stored there.

The sixth functional unit 6 may now, once new data from the fifth functional unit 5 exists, trigger the performance of functions in the fourth functional unit 4, which is indicated by the narrow arrow between the fourth and the sixth functional units. The sixth functional unit 6 may further, once new data from the fourth functional unit 4 exists, trigger the performance of functions in the fifth functional unit 5, which is indicated by the narrow arrow between the fifth and the sixth functional units. The sixth functional unit 6 may also enable the storing of data and the triggering of data-dependent functions in the fourth and/or fifth functional units 5.

The embodiment of the present invention illustrated in FIG. 2 will be explained in the following by means of an example of the use of an electronic signal processing system for the controlling of an internal combustion engine. A functional unit 1 generates a first periodical temporal signal, e.g., the signal for controlling a valve for the injection of fuel into the cylinder(s) of an internal combustion engine. A further functional unit 2 generates a second independent temporal signal, e.g., for the controlling of an ignition coil for the generation of an ignition spark in the internal combustion engine. A third functional unit 3 determines and counts a third temporal signal, e.g., the angle setting signal of the crankshaft of the internal combustion engine which is collected by an angle sensor. These three functional units 1, 2, and 3 may operate independently of each other and thus extend the system operability and the system performance, i.e., they increase the number of functions performed by the system per time unit and thus increase the operating speed of the system. The same integrated circuit as illustrated in FIG. 2 may, pursuant to the present invention, also be reconfigured for a security-relevant application by modifying the connection matrix and the configuration of the functional units.

Figure 3:
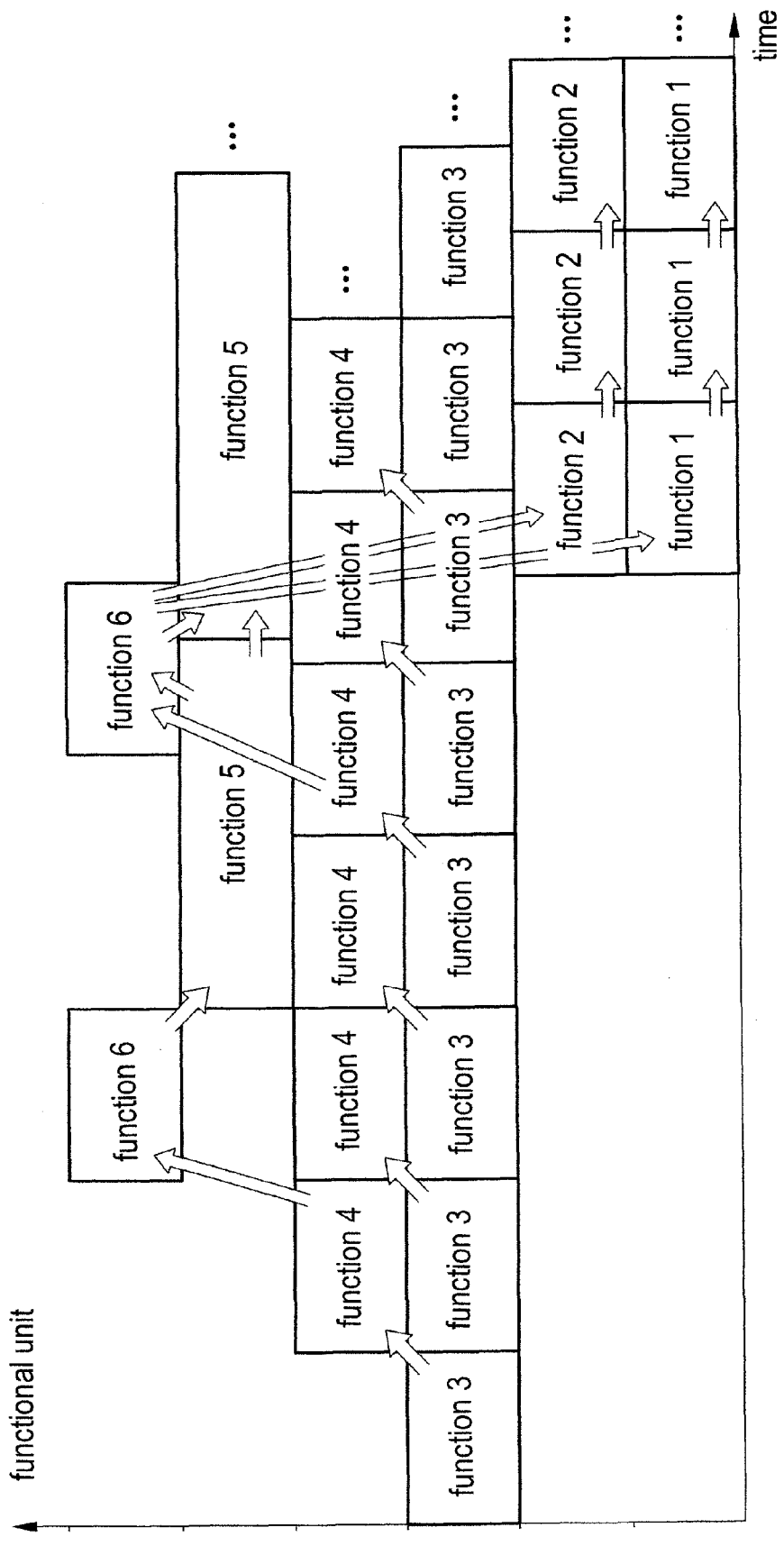
FIG. 3 shows a schematic representation of the chronological sequence of a configuration of functional units for the functional extension of a system according to a further embodiment of the present invention.

FIG. 3 shows the chronological sequence of a configuration for increasing the functional extension of a system according to an embodiment of the present invention. On the Y-axis, the individual functional units 1 to 6 are represented in a superimposed manner, and the functions 1 to 6 performed by the functional units 1 to 6 are represented in the chronological sequence on the X-axis. In the first period, the third functional unit 3, for instance, uses a function 3 while in the second period the third functional unit 3 performs the function 3 and a fourth functional unit 4 simultaneously performs another function 4. Between the first and the second periods, the third functional unit 3 transfers data or a configuration to the fourth functional unit 4, which is indicated by the arrow through the transition between the first and second periods.

In the embodiment illustrated in FIG. 3, a first and a second functional unit 1, 2 may operate both temporally and functionally in parallel while a third, fourth, fifth, and sixth functional unit 3, 4, 5, 6 may operate sequentially and synchronously to one another and thus extend the system operability. In the embodiment illustrated in FIG. 3, the same functional units 1, 2, 3, 4, 5, 6 may, for instance, each be configured or programmed differently by other functional units depending on the demand of the application, which is indicated by arrows between the functional units. Accordingly, both data and configurations can be transferred between the functional units 1, 2, 3, 4, 5, and 6.

As may be seen from the time diagram of FIG. 3, the transfer of data or configurations between the functional units 1, 2, 3, 4, 5, and 6 may take place both simultaneously and at different points in time. Furthermore, a functional unit may transmit data or configurations to one or several functional units simultaneously or sequentially. Moreover, several functional units may receive data or configurations simultaneously or sequentially from a functional unit.

Figure 4:
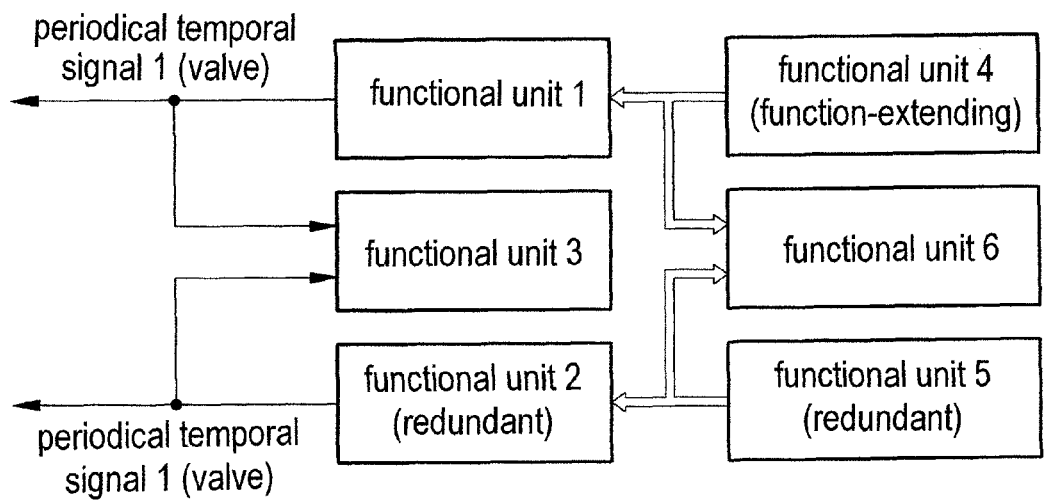
FIG. 4 shows a schematic representation of the configuration of functional units for increasing the error detection of the system according to a further embodiment of the present invention.

FIG. 4 shows a further embodiment of the present invention in which a configuration of functional units of a system may be performed to increase error detection. The embodiment of the present invention illustrated in FIG. 4 will be explained in the following by means of an example of the use of an electronic data processing system for the controlling of a brake booster in a vehicle.

In this embodiment, a first and a second functional unit 1, 2 may generate the same signal, e.g., for triggering an outlet valve for a wheel cylinder. This may, for instance, be necessary if a pressure decrease in the wheel cylinder has to be achieved due to the excessive braking of a blocking wheel. The first and second functional units 1, 2 therefore exert the same function, so that the second functional unit 2 is redundant with respect to the first functional unit 1. The signals generated by the first and second functional units 1, 2 are, for instance, to be executed synchronously and temporally periodically.

A third functional unit 3 may compare the temporal synchronism of the two redundant signals generated by the first and second functional units 1, 2. This happens, for instance, by counting the distance of signal edges that are available in the two signals generated by the first and second functional units 1, 2. A fourth and fifth functional unit 4, 5 may, for instance, simultaneously configure the first and second functional units 1, 2, which is indicated by the arrows from the fourth and fifth functional units 4, 5 to the first and second functional units 1, 2. This way, the fifth functional unit 5 is redundant with respect to the fourth functional unit 4. A sixth functional unit 6 may compare the configuration signals of the fourth and fifth functional units 4, 5 with each other.

In the two embodiments or examples of use of the present invention illustrated in FIG. 2 and in FIG. 4, the described configuration of the connection matrix with a number of signal lines and the configuration of the functional units of the integrated circuit may exist or may be modified at the following points of time:

during the development phase, for instance, by a corresponding physical implementation of the circuit, during the operation in the field, for instance, by a corresponding application-controlled configuration of the circuit, and/or upon existence of an incorrect function of one or a plurality of functional units.

The configurability may be of the following kind:

static, i.e., it has to be determined once only and may then be invariable, or dynamic, i.e., it may be variable as a function of an event or state.

Figure 5:
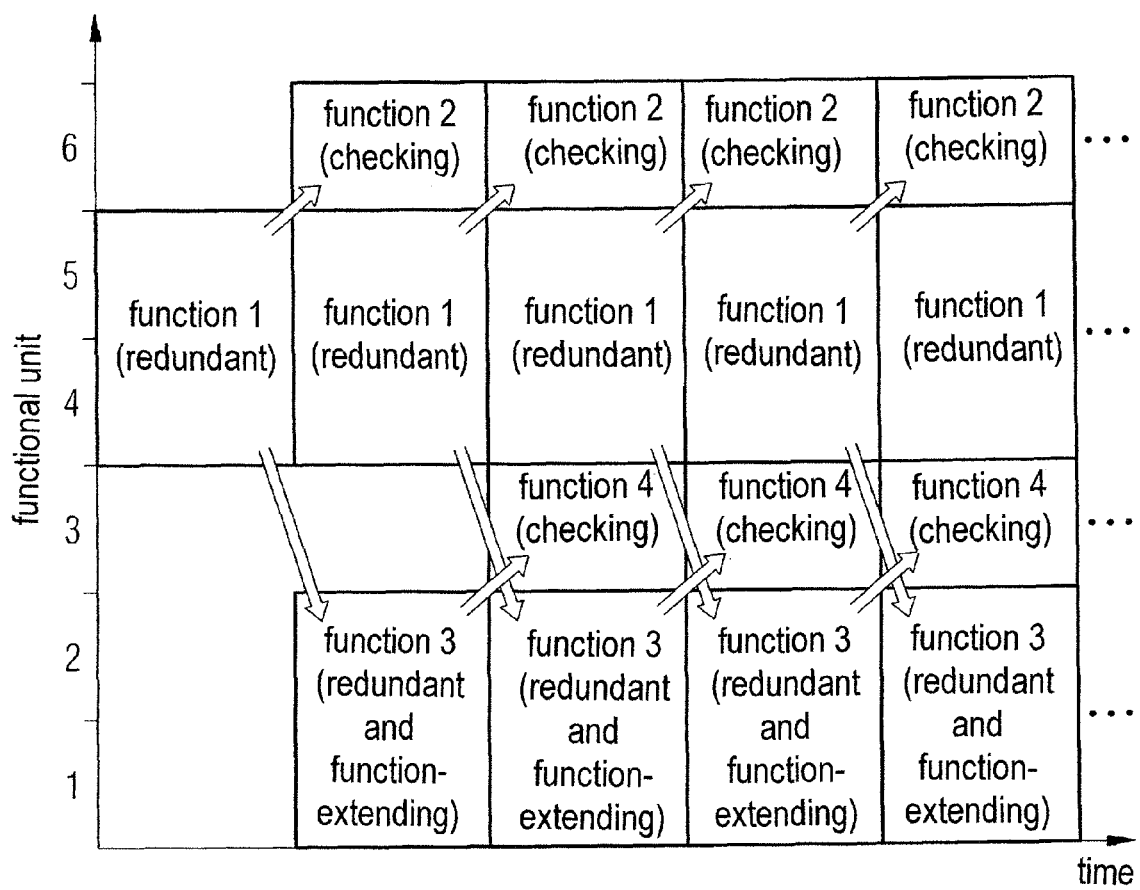
FIG. 5 shows a schematic representation of the chronological sequence of a configuration of functional units for increasing the error detection according to a further embodiment of the present invention.

FIG. 5 shows the chronological sequence of a configuration of functional units for increasing the error detection in accordance with an embodiment of the present invention. On the Y-axis, the individual functional units 1 to 6 are represented in a superimposed manner, and the functions 1 to 4 exerted by the functional units 1 to 6 are represented in chronological sequence on the X-axis. In the first period, the fourth and fifth functional units 4, 5, for instance, perform a function 1 while in the second period the first and second functional units 1, 2 simultaneously perform the function 3, and a sixth functional unit 6 performs another function 2. Between the first and second periods, the fourth and fifth functional units 4, 5 transfer data or configurations to the first and second functional units 1, 2 and to the sixth functional unit 6, which is indicated by the arrows through the transition between the first and second periods.

The first and second functional units 1, 2 and the fourth and fifth functional units 4, 5, respectively, each do not serve an extension of the functional scope, but a redundant function implementation, which is characterized by the attribute "redundant" and by the frame enclosing both functional units. The third and sixth functional units 3, 6 themselves do not provide any function, but merely serve checking for errors, which is characterized by the attribute "checking". The two first (function 1), the fourth, and the fifth functional units (function 3) are adapted to extend the system function, which is characterized by the attribute "redundant or function-extending". In the embodiment illustrated in FIG. 5, the first and the second functional units 1 and 2 act redundantly or in a function-extending manner. Thus, the functional units 1, 2 may be configured such that they contribute to an increase of the error detection in the system, to a function extension, or to a performance extension of the system.

The latter described embodiment of the present invention shows that it also allows for an architecture implementation of arbitrary mixed systems in which one part of the functional unit may serve a function extension, a second part of the functional unit may serve function checking, and a third part of the functional unit may serve the generation of redundancies. This way, this system architecture may also be used in such applications that require redundancy for partial functions only while other partial functions are not configured redundantly.

Furthermore, this architecture with a configuration of functional units for increasing error detection may also be used to generate three-fold redundancies or higher multiple redundancies in the system. Even if a particular number of functional units 1, 2, 3, 4, 5, or 6 were illustrated in the above-described embodiments or examples of use of the present invention, the circuit according to the invention may comprise an arbitrary number of functional units 1, 2, 3, ..., n which may each perform equal or different functions.

While particular exemplary embodiments were described in detail in the present description and illustrated in the enclosed drawings, such embodiments are to be understood as merely illustrative and are not to be interpreted as restricting the scope of protection of the invention. It is therefore pointed out that various modifications of the described, illustrated, or other embodiments of the invention may be performed without deviating from the scope of protection defined by the enclosed claims and from the gist of the invention.

What is claimed is:

1. A method for processing of data or signals, the method comprising:

performing a first configuration and/or programming of a connection matrix and of functional units in a system such that at least two functional units perform a same pulse width modulated signal such that multiple generated pulse width modulated signal results are transmitted to a further functional unit that compares the pulse width modulated signal results with one another and detects a deviation and/or a misconduct of one or several functional units or connections, the system comprising a plurality of functional units which are each adapted to apply one or several functions to the data or signals and which are connected with each other via the connection matrix for exchange of data or signals between the functional units; and performing a second configuration and/or programming of the connection matrix and of the functional units such that the at least two functional units perform a performance functions, wherein the performance functions of the at least two functional units are different.

2. The method according to claim 1, further comprising a third configuration and/or programming of the connection matrix and of the functional units such that at least one functional unit replaces one or more other functional units.

3. The method according to claim 1, wherein the at least one functional unit and/or the connection matrix is programmed or configured by another functional unit of the system.

4. The method according to claim 1, wherein the at least one functional unit and/or the connection matrix is configured or programmed as a function of an application of the system.

5. The method according to claim 1, wherein the at least one functional unit and/or the connection matrix is configured or programmed as a function of a function product of one or several other functional units.

6. The method according to claim 1, wherein the at least one functional unit and/or the connection matrix is newly programmed or configured during a development phase, during an operation, and/or upon existence of a faulty function of one or several functional units of the system.

7. The method according to claim 1, wherein the at least one functional unit transfers one or several input signals or input data as a function of their configuration and/or programming to one or several output signals or output data.

8. The method according to claim 7, wherein input signals or input data of the functional unit as well as output signals or output data of the functional unit are transmitted as a function of the configuration and/or programming of the connection matrix.

9. The method according to claim 1, wherein performing the first and/or second configuration and/or programming of the at least one functional unit and/or the connection matrix is performed statically or dynamically.

10. The method according to claim 1, wherein the functions performed by the functional units of the system comprise one or more of the following actions:
generation and/or detection of a state or a combination of states;
generation and/or detection of an event or a combination of events;
detection of a malfunction or of an error; and/or storing of a state or an event.

11. The method according to claim 1, wherein the performance functions control functions of a combustion engine.

12. The method according to claim 1, wherein both data and configurations are transferred simultaneously and/or sequentially between two or several functional units of the system.

13. The method according to claim 1, wherein a first number of functional units of the system perform their functions independently of a function of other functional units, and a second number of functional units of the system perform their functions depending on the function of other functional units.

14. The method according to claim 1, wherein a first number of functional units of the system are configured or programmed with such a configuration and/or function that extends operability or functional scope of the system, and a second number of the functional units of the system are configured or programmed with such a configuration and/or function that generates or increases a redundancy.

15. The method according to claim 1, wherein a first number of functional units of the system are configured or programmed with such a configuration and/or function that differs from functions of other functional units, and a second number of functional units are configured or programmed with such a configuration and/or function that checks the functions of other functional units, and a third number of functional units are configured or programmed with such a configuration and/or function that may generate redundancies.

16. A system for processing of data or signals, the system comprising:
a connection matrix; and
a plurality of functional units which are each adapted to apply one or several functions to the data or signals and which are connected with each other via the connection matrix for an exchange of data or signals between the functional units, wherein at least one functional unit of the system is programmable and/or configurable such that it is adapted to exert a particular function out of a number of different functions,
wherein the connection matrix is programmable and/or configurable such that the functional units are adapted to be connected with each other in a particular configuration out of a number of different configurations,
wherein at least two functional units are configured to perform the same pulse width modulated signal in a first configuration and/or programming such that multiple generated pulse width modulated signal results are transmitted to a further functional unit that compares the pulse width modulated signal results with one another and detects a deviation and/or a misconduct of one or several functional units or connections, and
wherein the at least two functional units are configured to perform performance functions in a second configuration and/or programming, wherein the performance functions are different.

17. The system according to claim 16, wherein the connection matrix comprises a number of electrical connections between inputs and outputs of the at least one configurable functional unit for the exchange of data or signals between the functional units.

18. The system according to claim 16, wherein the at least one functional unit and/or the connection matrix is programmable or configurable by another functional unit of the system.

19. The system according to claim 16, wherein the at least one functional unit and/or the connection matrix is programmable or configurable as a function of an application of the system, and/or requirement to redundancy, and/or a functional scope of the system.

20. The system according to claim 16, wherein the at least one functional unit and/or the connection matrix is programmable or configurable as a function of a function product of one or several other functional units of the system.

21. The system according to claim 16, wherein the at least one functional unit and/or the connection matrix is configurable or programmable with such a configuration and/or function that one functional unit compares function products or output signals of other functional units with each other.

22. The system according to claim 16, wherein the at least one functional unit is configurable during a development phase, during an operation, and/or upon existence of an incorrect or faulty function of one or several functional units of the system.

23. The system according to claim 16, wherein the at least one functional unit, for functional safeguarding of the system, is implemented redundantly in a once or several times configurable manner.

24. The system according to claim 16, wherein the at least one functional unit is implemented redundantly in an alternatively configurable manner.

25. The system according to claim 16, wherein the functional units and/or the connection matrix of the system is designed as electronic circuits, integrated circuits, and/or processors.

26. The system according to claim 16, wherein the functional units are designed as input units, output units, memory units, and/or logic units of the system.

27. The system according to claim 16, wherein the performance functions control functions of a combustion engine.

28. The system according to claim 16, wherein the at least one functional unit and/or the connection matrix is programmable or configurable several times during an operation of the system.

29. The method according to claim 1, wherein the at least one functional unit and/or the connection matrix is programmable or configurable several times during an operation of the system.

* * * * *